(12) United States Patent
Hector et al.

(10) Patent No.: US 8,202,171 B2
(45) Date of Patent: Jun. 19, 2012

(54) SAFETY GUARD FOR A DOUBLE UNIVERSAL JOINT

(75) Inventors: Martin Hector, Siegburg (DE); Paul Herchenbach, Ruppichteroth (DE)

(73) Assignee: GKN Walterscheid GmbH (DE)

(*) Notice: Subject to any disclaimer, the term of this patent is extended or adjusted under 35 U.S.C. 154(b) by 263 days.

(21) Appl. No.: 12/503,890

(22) Filed: Jul. 16, 2009

(65) Prior Publication Data

US 2010/0029398 A1 Feb. 4, 2010

(30) Foreign Application Priority Data

Jul. 18, 2008 (DE) .......................... 10 2008 033 920

(51) Int. Cl.
*F16D 3/84* (2006.01)

(52) U.S. Cl. ......................................... 464/175; 464/905

(58) Field of Classification Search .................. 464/117, 464/118, 170–175, 177, 178, 113–116, 905; 74/609; 180/346, 380

See application file for complete search history.

(56) References Cited

U.S. PATENT DOCUMENTS

| | | | | |
|---|---|---|---|---|
| 830,203 A | * | 9/1906 | Bogart | 464/175 X |
| 2,027,329 A | * | 1/1936 | Van Ranst | 464/171 X |
| 2,255,172 A | * | 9/1941 | Johnson | 464/175 X |
| 2,857,975 A | * | 10/1958 | Thorne | 464/115 X |
| 4,262,498 A | * | 4/1981 | Krude et al. | 464/175 X |
| 4,605,332 A | | 8/1986 | Mayhew et al. | |
| 5,707,066 A | | 1/1998 | Sugiura et al. | |
| 6,159,104 A | | 12/2000 | Mikeska et al. | |
| 6,186,901 B1 | * | 2/2001 | Bondioli | 464/172 X |
| 6,406,375 B1 | | 6/2002 | Herchenbach et al. | |
| 6,966,838 B2 | | 11/2005 | Herchenbach et al. | |
| 7,144,327 B2 | | 12/2006 | Coenen et al. | |
| 2005/0124424 A1 | | 6/2005 | Coenen et al. | |
| 2007/0267245 A1 | * | 11/2007 | Rodriguez | 180/380 |

FOREIGN PATENT DOCUMENTS

| | | |
|---|---|---|
| CH | 381478 | 10/1964 |
| DE | 1 966 532 | 8/1967 |
| DE | 195 44 911 | 6/1996 |
| DE | 100 37 041 | 6/2001 |
| DE | 101 53 822 C1 | 4/2003 |
| DE | 103 52 162 B3 | 6/2005 |
| EP | 0 969 218 | 1/2000 |
| EP | 1 529 429 | 5/2005 |
| GB | 899511 * | 6/1962 |
| JP | 62-288727 A * | 12/1987 |

* cited by examiner

*Primary Examiner* — Gregory Binda
(74) *Attorney, Agent, or Firm* — Harness, Dickey & Pierce, P.L.C.

(57) ABSTRACT

A safety guard for a double universal joint (1) rotatingly arranged around an axis of rotation has a tubular protective cone (15). The cone (15) has a connection mechanism to non-rotationally connect the protective cone (15) to a drive shaft guard of a shaft connected to the double universal joint (1). A sliding ring (16) rotatingly supports the safety guard on the double universal joint (1). It is non-rotationally connected to the protective cone (15). An adaptor ring (22) is non-rotationally connected to the protective cone (15). A boot (23) is non-rotationally connected to the adaptor ring (22). The boot (32) has a connection mechanism to non-rotationally connect the boot (23) to a stationary component.

17 Claims, 3 Drawing Sheets

SAFETY GUARD FOR A DOUBLE UNIVERSAL JOINT

CROSS-REFERENCE TO RELATED APPLICATION

This application claims priority to German Patent Application No. 102008033920.2 filed Jul. 18, 2008, which application is herein expressly incorporated by reference.

FIELD

The disclosure relates to a safety guard for a double universal joint that is rotatingly arranged around an axis of rotation. A tubular protective cone has a connection mechanism for the non-rotational connection of the protective cone to a drive shaft guard of a shaft connected to the double universal joint. A sliding ring rotationally supports the safety guard. The sliding ring is rotatably supported on the double universal joint and is non-rotationally connected to the protective cone.

BACKGROUND

A safety guard is known from DE 101 53 822 C1. The protective cone is arranged around a first universal joint of the double universal joint. The protective cone is non-rotationally connected to a protective element via a connection mechanism in the form of retaining projections. The protective element is connected to the protective cone and to the drive shaft guard. It is provided in the form of a lattice structure. The protective element is flexibly formed and is able to compensate for angular deviations. A first end of the protective cone is arranged facing away from the protective element. The first end projects beyond the sliding ring and partially covers a second universal joint of the double universal joint.

SUMMARY

It is the object of the present disclosure to provide a safety guard that achieves complete protection of the double universal joint.

The object is solved according to the disclosure by a safety guard with an adaptor ring. The adaptor ring is non-rotationally connected to the protective cone. A boot is non-rotationally connected to the adaptor ring. A connection mechanism non-rotationally connects the boot to a stationary component.

Accordingly, it is ensured that the double universal joint is completely protected. The adaptor ring enables the use of a single boot size for different large sized double universal joints. In different sizes of double universal joints, the sliding ring as well as the protective cone is adapted to the size of the double universal joint. An adaptor ring can be provided for each protective cone size. The adaptor ring is adapted so that it can be pushed onto a respective size of a protective cone. All adaptor rings are again formed for differently sized large protective cones. Thus, a joint size of a boot can be connected to the adaptor ring. Accordingly, the necessary multitude of parts is distinctly reduced, since a single boot type can be used for differently sized large double universal joints.

The protective cone has a first end that connects the protective cone to the sliding ring and the adaptor ring. Particularly, the adaptor ring can be arranged around the sliding ring. In this case, the protective cone does not project or projects only slightly beyond the sliding ring. Thus, the length of the boot can be as large as possible to enable it to compensate for angular movements in an advantageous manner.

The protective cone as well as the adaptor ring can be connected to the sliding ring to provide the best possible attachment to the adaptor ring. The boot has an attachment portion that connects the boot to the adaptor ring. In this case, the adaptor ring has an attachment receptacle. The attachment portion of the boot is accommodated and retained by the attachment receptacle. The attachment receptacle has at least one attachment face facing the protective cone. The attachment portion of the boot is held against the attachment receptacle. Preferably, a single first attachment face is provided. The single first attachment face is arranged circumferentially extending around the axis of rotation.

Furthermore, it can be provided, that the attachment receptacle has at least one second attachment face facing the boot. The attachment portion of the boot is held against the second attachment face.

In this case, several second attachment faces can be provided, which, respectively, are formed by one projection on the adaptor ring. Preferably, the second attachment faces are arranged on a circumferentially extending imaginary envelope plane.

Alternatively, a single circumferentially extending second attachment face, facing the boot, can be provided. An attachment groove is formed by the second attachment face and exactly one circumferentially extending first attachment face. The attachment groove is especially formed as an inner circumferential groove.

The attachment faces can be conically form, respectively, to the axis of rotation. When several first or second attachment faces are provided, they can be arranged on a conical imaginary plane envelope.

The boot has several circumferentially extending folds, which, respectively, are formed by two flanks to ensure a simple assembly of the boot. The attachment portion of the boot comprises one fold. The flanks abut each other. The at least one first attachment face is held in abutment against the flanks.

Thus, the attachment portion can be simply inserted between the at least one first attachment face and the at least one second attachment face. In this case, the adaptor ring is already connected to the boot without a further attachment mechanism being necessary. The attachment portion of the boot is clamped between the at least one first attachment face and the at least one second attachment face. Alternatively, it is engaged in the intermediate space between the attachment faces.

The attachment portion is formed by the flanks of one fold. Thus, the length of the boot can be adapted in a simple manner, such that the folds are cut off corresponding to the necessary length of the boot. When all folds have the same outer diameter and inner diameter, each fold can serve as an attachment portion. Thus, the multiplicity of parts is again reduced. The same boot can be used because of the use of different adaptor rings for different protective cones and because of the possibility of cutting-off individual folds for different lengths.

After the pre-assembly of the adaptor ring to the boot, a fast and durable connection can be achieved. Attachment screws are screwed through the adaptor ring into the attachment portion of the boot. After the pre-assembly of the adaptor ring to the boot, the adaptor ring can be attached by attachment screws on the protective cone. In this case, at least a part of the attachment screws can be also screwed into the sliding ring. The attachment portion of the boot is held between the at least one first attachment face of the adaptor ring and the protective cone. In this case, the attachment screws can be screwed through the adaptor ring and through the attachment portion of the boot into the protective cone.

Further areas of applicability will become apparent from the description provided herein. The description and specific examples in this summary are intended for purposes of illustration only and are not intended to limit the scope of the present disclosure.

DRAWINGS

Following preferred embodiments are described in detail using the drawings.

DETAILED DESCRIPTION

A preferred embodiment of the present disclosure will be described with reference to accompanied drawings.

Figure 1:
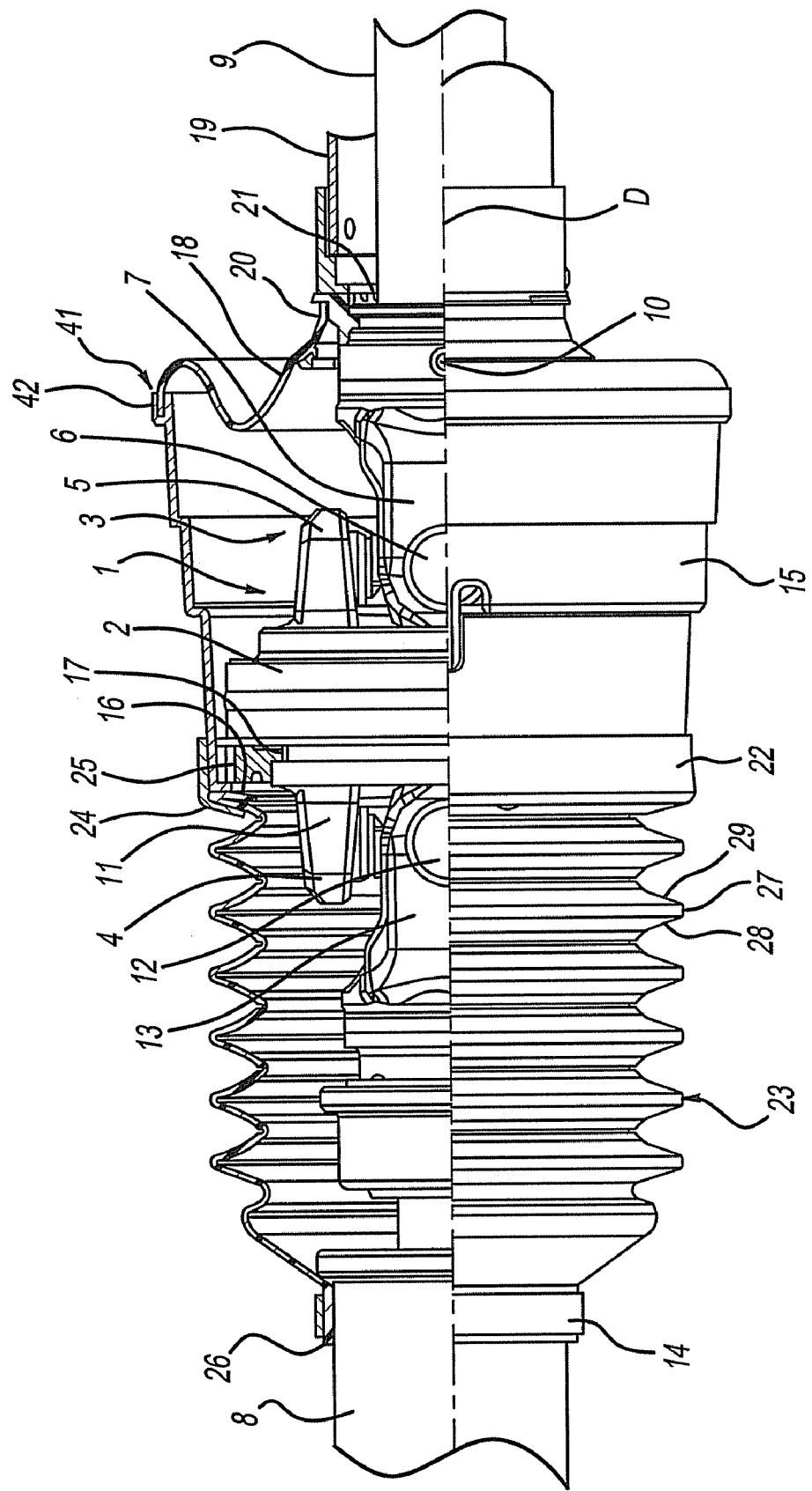
FIG. 1 is a safety guard according to the disclosure in a partial longitudinal sectional view.

FIG. 1 illustrates a double universal joint 1 with a double yoke 2. The double yoke 2 is part of a first universal joint 3 and a second universal joint 4. The first universal joint 3 includes a first inner yoke 5, which forms part of a double yoke 2. The first inner yoke 5 is connected, via a first cross 6, to a first outer yoke 7. The first outer yoke 7 has a receptacle, not shown here, in the form of a through hole. The first outer yoke 7 receives a tube 9 of a joint yoke. The tube 9 is secured, via a hollow spring type slotted pin 10, to the first outer yoke 7. The tube 9 is only partially shown here and is connected at an end, not shown here, to a further universal joint or a double universal joint, thus forming a drive shaft.

At the side facing away from the first inner yoke 5, the double yoke 2 has a second inner yoke 11. The second inner yoke 11 is connected via a second cross 12 to a second outer yoke 13. The second outer yoke 13 is formed as a connecting yoke and serves to connect the double universal joint 1 to a power take-off shaft of a gearbox. For this, the second outer yoke 13 has a connection bore, not shown here, that includes longitudinal teeth. The second outer yoke 13, via the longitudinal teeth, can be pushed onto a correspondingly toothed shaft portion.

The double universal joint 1 is rotatingly arranged around The double universal joint 1 includes a stationary safety guard. The stationary guard includes a protective cone 15 that is non-rotationally connected to a sliding ring 16. The sliding ring 16 is arranged within the protective cone 15 and is slidingly rotatably accommodated in a groove of the double yoke 2. The protective cone 15 is arranged around the first universal joint 3. The protective cone 15 is non-rotationally connected, via a protective element 18, to a drive shaft guard, in the form of a protective tube 19. The protective tube 19 is connected to a sliding ring 20. The sliding ring 20 is rotatably accommodated in a groove 21 of the first outer yoke 7. The protective tube 19 protects the tube 9 and is arranged around it. The protective element 18 non-rotational connects the protective cone 15 to the protective tube 19. The protective element 18 is elastically formed to compensate for angular deviations between the protective cone 15 and the protective tube 19. The protective element 18 is formed as a membrane, in this case. The protective cone 15 has a connection mechanism in the form of a holding slot 41 to connect the protective element 18 to the protective cone 15. A holding portion 42 of the protective element 18 is accommodated and fixed in the holding slot 41.

The protective cone 15 projects only slightly beyond the sliding ring 16 at the end of the protective cone 15 facing away from the protective element 18 A boot 23 is provided to protect the second universal joint 4. The boot 23 is connected to an adaptor ring 22. The adaptor ring 22 is connected to the protective cone 15. The boot has an attachment portion 24 to attach the boot 23. The attachment portion 24 is held in an attachment receptacle 25 of the adaptor ring 22.

The boot 23 is arranged around the second universal joint 4. The boot 23 has, at an end distanced from the adaptor ring 22, a connection mechanism in the form of a connecting portion 26. The boot 23 is non-rotationally attached by a clamping strap 14 to a gearbox housing 8.

The boot has several folds 27 that, respectively, have a first flank 28 and a second flank 29. The flanks 28, 29 are conically formed. The flanks 28, 29 are arranged at an angle to each other.

The boot 23 is non-rotationally connected to a stationary component as well as non-rotationally connected, via the adaptor ring 22, to the protective cone 15. The protective cone 15 is non-rotationally connected, via the protective element 18, to the protective tube 19. Thus, the entire safety guard is non-rotationally held so that the double universal joint 1 can rotate inside of it.

Figure 2:
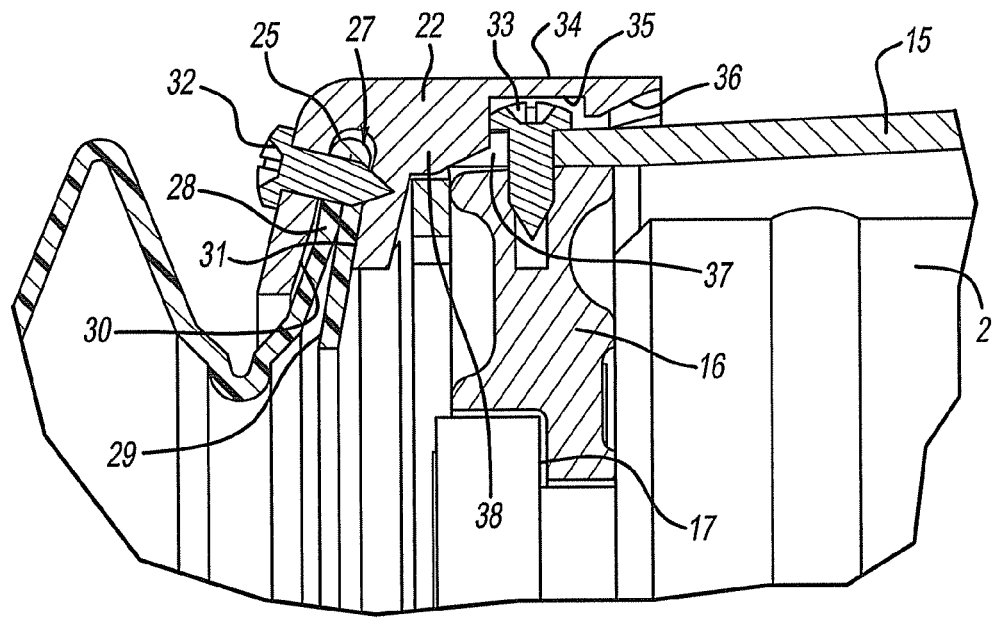
FIG. 2 is a sectional view of an enlarged representation of a first embodiment of an adaptor ring.
Figure 3:
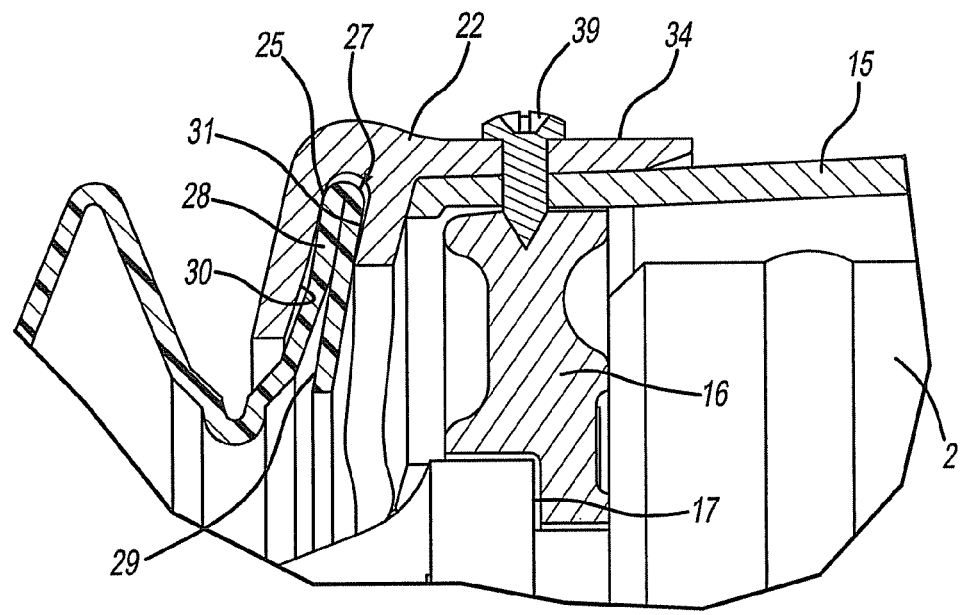
FIG. 3 is a further sectional view of the adaptor ring of FIG. 2.

FIGS. 2 and 3 show enlarged views of the safety guard in the area of the adaptor ring, according to a first embodiment. The sectional views of FIGS. 2 and 3 are arranged in different planes radially to the axis of rotation D.

The adaptor ring 22 has an attachment receptacle 25 in the form of an inner circumferential groove. The inner circumferential groove includes a first attachment face that faces the protective cone 15. A second attachment face 31 faces the boot 23. The two attachment faces 30, 31 face each other and form, together, the inner circumferential groove. Generally, the attachment receptacle 25 can, however, also be formed as an outer circumferential groove. A fold 27 of the boot 23 is arranged in the attachment receptacle 25. The attachment receptacle is in the form of the inner circumferential groove. In this case, the fold 27 is arranged closest to the protective cone 15. The two flanks 28, 29 of the fold 27 are folded towards each other. Thus, they abut each other and are aligned parallel to each other. The two flanks 28, 29 are conically arranged.

The cone opens towards the protective cone 15. The attachment receptacle 25 is correspondingly conically formed. The first flank 28 is held in abutment with the first attachment face 30. The second flank 29 is held in abutment with the second attachment face 31. Solely by the accommodation of the fold 27 in the attachment receptacle 25, the adaptor ring 22 is held on the boot 23. Attachment screws 32 are provided to further secure the boot 23. The attachment screws 32 are screwed from the outside through the adaptor ring 22 into the attachment receptacle 25. The attachment screws 32 pass through the attachment receptacle 25 and enter the second attachment face 21. In this case, the attachment screws 32 are screwed through the fold 27 of the boot 23. Thus, the adaptor ring 22 is retained on the boot 23.

The adaptor ring 22 is pre-assembled and can be pushed initially onto the protective cone 15. The protective cone 15 is connected, via attachment screws 33, to the sliding ring 16. The attachment screws 33 are screwed radially inwards into the sliding ring 16 from the outside through the protective cone 15. The attachment screws 33 project, respectively, with their screw heads beyond the outer circumferential face of the protective cone 15.

The adaptor ring 22 has a connecting portion 34 that is approximately cylindrically formed. The adaptor ring 22, via the connecting portion 34, rests on the protective cone 15. The connecting portion has an abutment face 36 to mount the connecting portion 34. The abutment face 36 is arranged at an angle to the axis of rotation D. The abutment face 36 comes into abutment with the attachment screws 33 when pushing on the connecting portion 34. Thus, the connecting portion 34, when further pushed, is expanded at the positions of the attachment screws 33. A recess 35 is between the abutment face 36 and the attachment receptacle 25. The recess 35 is adapted to the projecting portion of the attachment screw 33 and is provided for each attachment screw 33. This means, that each recess 35 can completely accommodate the screw head of one of the attachment screws 33. The recess 35 is adapted in its dimensions to the screw head. The attachment screw 33 enters the recess 35 when sliding the connecting portion 34 completely on. Thus, the connecting portion 34 can return back into its starting position. The connecting portion 34 is pushed onto or attached to the protective cone 15. It is preliminarily held on the protective cone 15. Further attachment screws 39 are provided for further attachment. The attachment screws 39 are screwed radially inward from the outside into the connecting portion 34 until they are screwed into the protective cone 15. In this case, the attachment screws 39 can be arranged in a radial direction relative to the axis of rotation. The attachment screws 39 also enter, at the same time, the sliding ring 16. Alternatively, it is also possible that the attachment screws 39 are arranged laterally off-set to the sliding ring 16 and are only screwed into the protective cone 15.

One or several locking cams 38 provide for rotational securement or for load relief for the attachment screws. The locking cams 38 project radially inwards and are provided on the adaptor ring 22. The locking cams 38 radially engaged in locking recesses 37 of the protective cone 15. Thus, the adaptor ring 22 is supported in a circumferential direction, via the locking cams 38, on the locking recess 37. Thus, a torque is supported via the locking cams 38 and not via the attachment screws 39 that connect the adaptor ring 22 to the protective cone 15.

Figure 4:
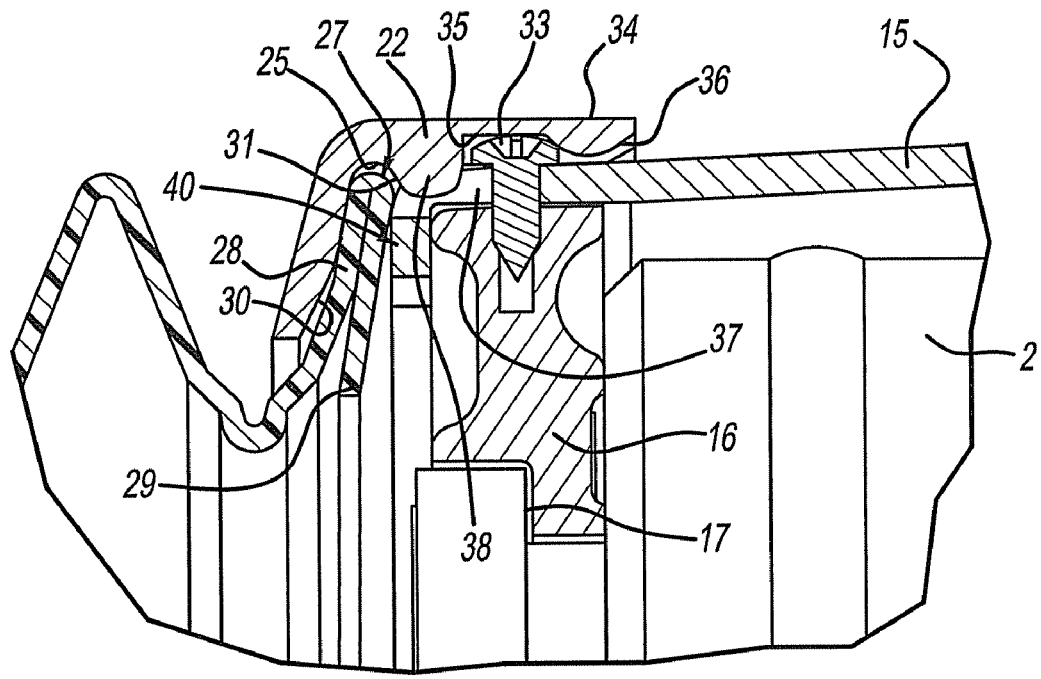
FIG. 4 is a sectional view of an enlarged representation of a second embodiment of an adaptor ring.
Figure 5:
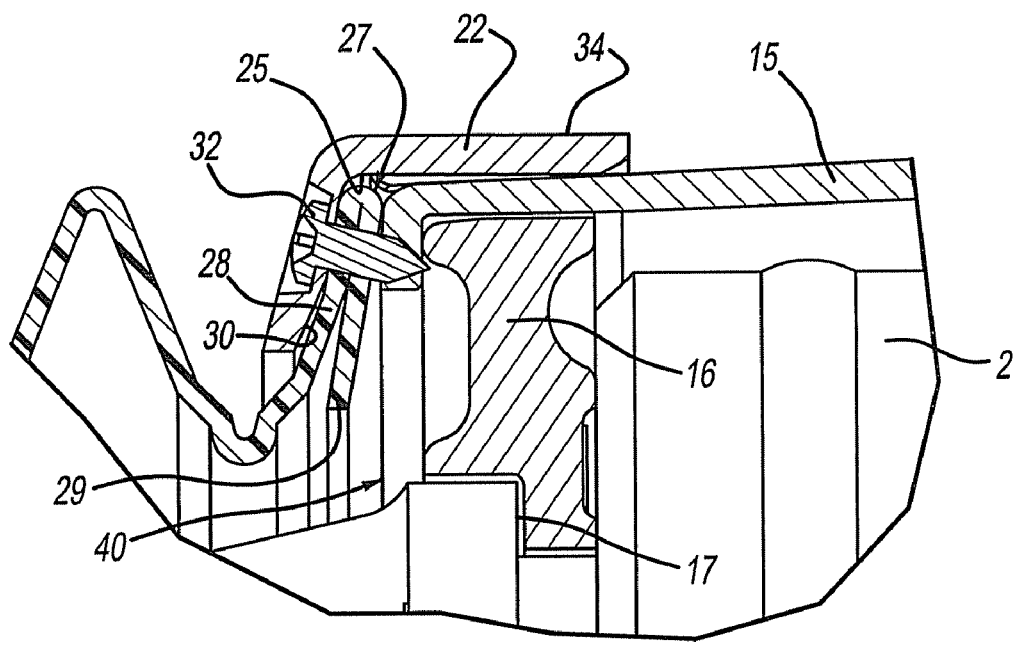
FIG. 5 is a further sectional view of the adaptor ring of FIG. 4.

FIGS. 4 and 5 show a second embodiment of a safety guard according to the disclosure. The attachment of the adaptor ring onto the protective cone 15 is identical to the attachment according to the first embodiment.

FIG. 4 illustrates the attachment receptacle 25 formed by a first attachment face 30. The attachment face 30 is formed circumferentially extending from the adaptor ring 22. Several second attachment faces 31 face the first attachment face 30. The second attachment faces 31 are formed, respectively, by one of the retaining cams 38. Thus, the adaptor ring 22 can also be attached on the boot 23 during the pre-assembly. To secure the attachment of the boot 23, the fold 27 is accommodated in the attachment receptacle 25. The fold 27 is pressed by the first attachment face against the first end 40 of the protective cone 15. Thus, the fold 27 is clamped and secured between the first end 40 of the protective cone 15 and the first attachment face 30. Attachments screws 32 serve (FIG. 5) comparable to the first embodiment to secure the boot 23 to the adaptor ring 22. The screws 32 are screwed from the outside into the adaptor ring 22. The attachment screws 32 are then screwed through the fold 27 into the first end 40 of the protective cone 15.

The description of the disclosure is merely exemplary in nature and, thus, variations that do not depart from the gist of the disclosure are intended to be within the scope of the disclosure. Such variations are not to be regarded as a departure from the spirit and scope of the disclosure.

What is claimed is:

1. A safety guard for a double universal joint rotatingly arranged around an axis of rotation comprising:
   a tubular protective cone including a connection mechanism for non-rotationally connecting the protective cone to a drive shaft guard of a shaft connected to the double universal joint;
   a sliding ring which is designed for being rotationally supported on the double universal joint, supports the safety guard, said sliding ring is non-rotationally connected to the protective cone;
   an adaptor ring is non-rotationally connected to the protective cone, a circumferential groove is formed by the adaptor ring for receiving a fold of a boot; and
   the boot is non-rotationally connected to the adaptor ring by the fold of the boot received in the circumferential groove of the adaptor ring, said boot has a connection mechanism for non-rotationally connecting the boot to a stationary component.

2. The safety guard according to claim 1, wherein the protective cone has a first end, said first end is connected to the sliding ring and the adaptor ring.

3. The safety guard according to claim 1, wherein the adaptor ring is arranged around the sliding ring.

4. The safety guard according to claim 1, wherein the protective cone as well as the adaptor ring are connected to the sliding ring.

5. The safety guard according to claim 1, wherein the circumferential groove defines at least one attachment face, facing the protective cone, the fold of the boot is held against said attachment face.

6. The safety guard according to claim 5, wherein the circumferential groove defines at least one second attachment face facing the boot, the fold of the boot is held against said second attachment face.

7. The safety guard according to claim 6, wherein at least one projection is provided on the adaptor ring that, respectively, forms the second attachment face.

8. The safety guard according to claim 6, wherein the attachment faces are, respectively, conically formed relative to the axis of rotation.

9. The safety guard according to claim 1, wherein a first circumferentially extending attachment face is provided.

10. The safety guard according to claim 9, wherein a second circumferentially extending attachment face is provided facing the boot, the second attachment face together with the first circumferentially extending attachment face forms the attachment groove.

11. The safety guard according to claim 1, wherein the boot has several circumferentially extending folds which, respectively, form two flanks, the fold with its flanks abutting each other and at least one first attachment face is held in abutment with said fold.

12. The safety guard according to claim 1, wherein attachment screws are screwed through the adaptor ring into the fold of the boot.

13. The safety guard according to claim 1, wherein the adaptor ring is attached by attachment screws on the protective cone.

14. The safety guard according to claim 13, wherein at least one portion of the attachment screws is also screwed into the sliding ring.

15. The safety guard according to claim 1, wherein the fold of the boot is held between at least one first attachment face of the adaptor ring and the protective cone.

16. The safety guard according to claim 15, wherein attachment screws are screwed through the adaptor ring and through the fold of the boot into the protective cone.

17. A double universal joint with a safety guard arranged around an axis of rotation, said safety guard comprising:

an adaptor ring;

a tubular protective cone non-rotationally connected to a drive shaft guard of a shaft connected to the double universal joint and one end of said tubular protective cone, which end is remote from the drive shaft guard, is non-rotationally connected to the adaptor ring;

a sliding ring slidably and rotationally supported on and in sliding contact with the double universal joint for supporting the safety guard, said sliding ring is non-rotationally connected to the protective cone; and a boot non-rotationally connected to the adaptor ring, said boot has a connection mechanism for non-rotationally connecting the boot to a stationary component.

* * * * *